United States Patent
Omura

(10) Patent No.: US 10,146,148 B2
(45) Date of Patent: Dec. 4, 2018

(54) IMAGE FORMING APPARATUS CONFIGURED TO DETECT COLOR MISREGISTRATION AND METHOD CONTROLLING IMAGE FORMING APPARATUS CONFIGURED TO DETECT COLOR MISREGISTRATION

(71) Applicant: CANON KABUSHIKI KAISHA, Tokyo (JP)

(72) Inventor: Naoka Omura, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/904,188

(22) Filed: Feb. 23, 2018

(65) Prior Publication Data
US 2018/0246436 A1 Aug. 30, 2018

(30) Foreign Application Priority Data
Feb. 28, 2017 (JP) ................................ 2017-037736

(51) Int. Cl.
*G03G 15/01* (2006.01)
*G03G 15/00* (2006.01)
*G06F 3/12* (2006.01)

(52) U.S. Cl.
CPC ..... *G03G 15/0131* (2013.01); *G03G 15/0184* (2013.01); *G03G 15/5054* (2013.01); *G03G 15/5062* (2013.01); *G06F 3/1278* (2013.01); *G03G 2215/00059* (2013.01); *G03G 2215/0161* (2013.01)

(58) Field of Classification Search
CPC .......... G03G 15/0131; G03G 15/5054; G03G 15/5062; G03G 2215/00059; G03G 2215/0158; G03G 2215/0161
See application file for complete search history.

(56) References Cited

U.S. PATENT DOCUMENTS

2006/0092257 A1* 5/2006 Dejong .............. G03G 15/0152
347/116
2006/0182472 A1* 8/2006 Munakata .......... G03G 15/0194
399/299
(Continued)

FOREIGN PATENT DOCUMENTS

JP H09-244337 A 9/1997

*Primary Examiner* — Sandra Brase
(74) *Attorney, Agent, or Firm* — Canon U.S.A., Inc. IP Divison

(57) ABSTRACT

An image forming apparatus includes a plurality of image forming units configured to form images, an image bearing member, a detection unit configured to detect a pattern image formed on the image bearing member, the pattern image being used for detecting a color misregistration, a controller configured to control the plurality of image forming units to form a plurality of first pattern images, each having a different color, and control the detection unit to detect the color misregistration, and a storage unit configured to store data on the color misregistration, wherein the controller corrects an image forming position based on the stored data, and wherein in a case where an error is detected in the data, the controller controls the plurality of image forming units to form a plurality of second pattern images, different form the plurality of first pattern images, before the plurality of first pattern images is formed.

20 Claims, 10 Drawing Sheets

(56) References Cited

U.S. PATENT DOCUMENTS

| | | | |
|---|---|---|---|
| 2009/0196636 A1* | 8/2009 | Miyadera | G03G 15/0194 399/39 |
| 2012/0229585 A1* | 9/2012 | Higashiyama | G03G 15/0194 347/116 |
| 2014/0169843 A1* | 6/2014 | Igarashi | G03G 15/5058 399/301 |

* cited by examiner

IMAGE FORMING APPARATUS CONFIGURED TO DETECT COLOR MISREGISTRATION AND METHOD CONTROLLING IMAGE FORMING APPARATUS CONFIGURED TO DETECT COLOR MISREGISTRATION

BACKGROUND

Field of the Disclosure

The present disclosure generally relates to image forming and, more particularly, to an image forming apparatus, an image forming method, and color misregistration correction control.

Description of the Related Art

An electrophotographic image forming apparatus includes a plurality of image forming units configured to form images of different colors. The images formed by the plurality of image forming units are superimposed and transferred so that a full-color image is formed. In such an image forming apparatus, when the images of different colors are superimposed and transferred, if the relative positions of the images of the respective colors are deviated, the color taste of the image formed on a sheet is changed.

Thus, an image forming apparatus discussed in Japanese Patent Application Laid-Open No. 9-244337 executes color misregistration correction control to correct the relative positions of images of different colors. When the image forming apparatus executes the color misregistration correction control, a plurality of image forming units forms pattern images on an image bearing member, and data for correcting the relative positions of images of respective colors is generated based on a result of detection of the pattern images by a sensor and then stored in a storage device. Then, when the image forming apparatus forms an image on a sheet, the image forming apparatus corrects the writing timings of the plurality of image forming units based on the data stored in the storage device.

If, for example, the supply of power to the image forming apparatus is stopped while the image forming apparatus is writing the data to the storage device, normal data may not be written to the storage device. Thus, although. the color misregistration correction control is executed, correct data is not stored in the storage device. In this case, after the supply of power to the image forming apparatus is resumed, the image forming apparatus forms an image based on the incorrect data stored in the storage device, and therefore, the color taste of an output image is changed.

SUMMARY

According to one or more aspects of the present disclosure, an image forming apparatus includes a plurality of image forming units configured to form images, each having a different color, an image bearing member, a detection unit configured to detect a pattern image formed on the image bearing member, the pattern image being used for detecting a color misregistration, a controller configured to control the plurality of image forming units to form on the image bearing member a plurality of first pattern images, each having a different, color, and control the detection unit to detect a color misregistration amount related to relative positions between a pattern image having a reference color among the plurality of first pattern images and a pattern image having another color among the plurality of first pattern images, and a storage unit configured to store data on the color misregistration amount, wherein the controller corrects an image forming position of an image of the other color which is to be formed by the plurality of image forming units, based on the data stored in the storage unit, wherein in a case where an error is detected in the data stored in the storage unit, the controller controls the plurality of image forming units to form on the image bearing member a plurality of second pattern images each having a different color before the plurality of first pattern images is formed, and wherein the plurality of second pattern images is different from the plurality of first pattern images.

Further features of the present disclosure will become apparent from the following description of exemplary embodiments with reference to the attached drawings.

DESCRIPTION OF THE EMBODIMENTS

One or more aspects of the present disclosure will be described below with reference to the accompanying drawings.

(Image Forming Apparatus)

Figure 1:
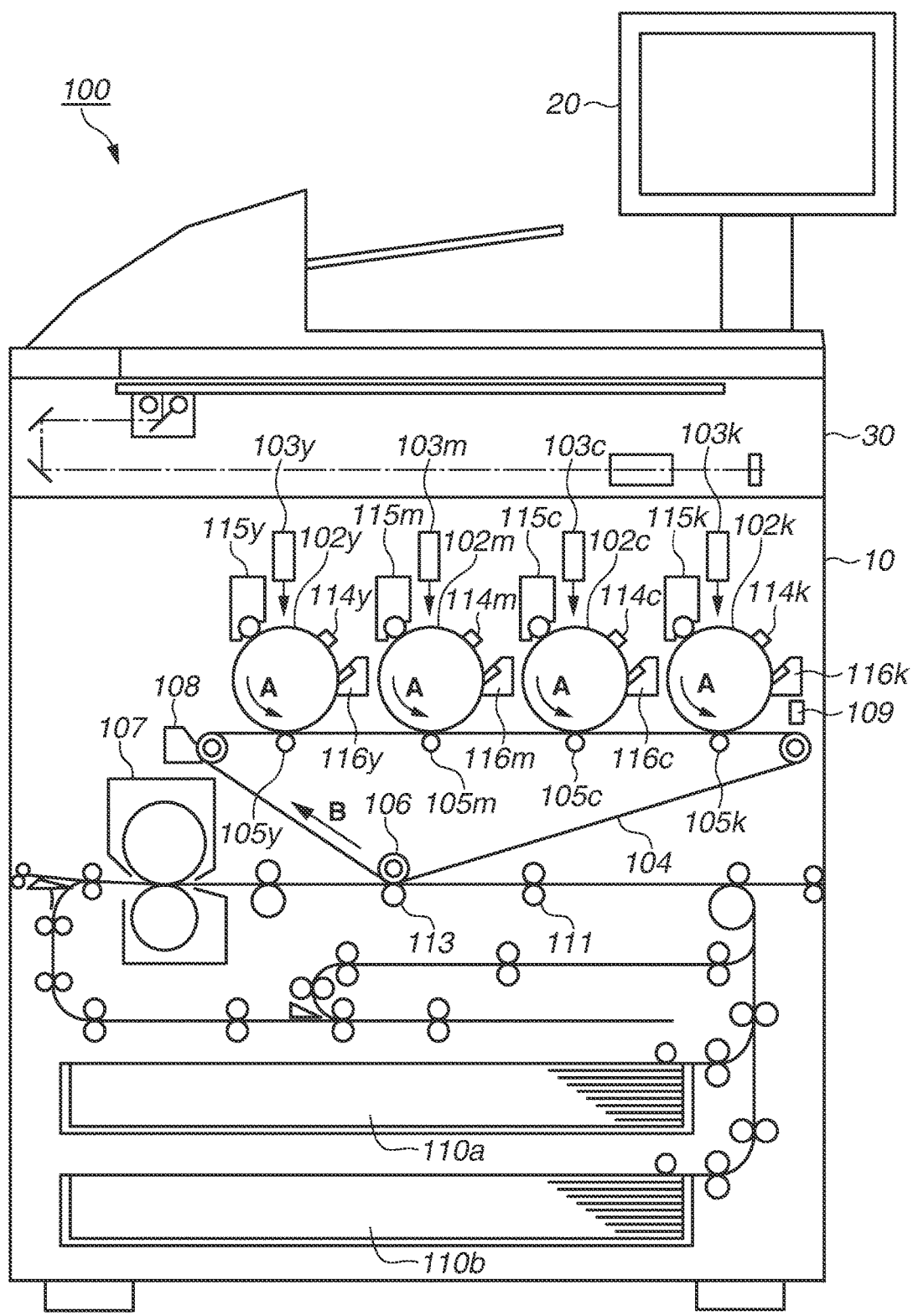
FIG. 1 is a cross-sectional view schematically illustrating an image forming apparatus.

FIG. 1 is a cross-sectional view schematically illustrating an image forming apparatus 100. FIG. 1 schematically illustrates the structure of an electrophotographic full-color printer. The image forming apparatus 100 includes a printer 10, an operation panel 20, a reader 30. The reader 30 reads a document and generates image data. The printer 10 forms an image on a sheet based on the image data generated by the reader 30 or forms an image on a sheet based on image data transferred from an external device.

The printer 10 includes image forming units Y, M, C, and Bk(K) which form respective images of yellow, magenta, cyan, and black. The image forming unit Y which forms images of yellow includes a photosensitive drum 102y, a charging device 114y which charges the photosensitive drum 102y, and an exposure device 103y which emits laser beams (laser light) for forming an electrostatic latent image on the charged photosensitive drum 102y. A photosensitive layer which functions as a photosensitive member is formed on the surface of the photosensitive drum 102y. The image forming unit Y is provided with a development device 115y which develops the electrostatic latent image with a development agent and a drum cleaner 116 which cleans residual toner remaining on the photosensitive drum 102y. The image forming units M, C, and Bk for forming images of the other colors have a structure similar to that of the image forming unit Y, so description thereof is omitted.

The following describes an image forming process performed by the image forming apparatus 100. Respective image forming processes performed by the image forming units Y, M, C, and Bk are similar, and therefore, the image forming unit Y for yellow will be described as an example. If an image forming operation is started, the photosensitive drum 102y is rotated in the direction of an arrow A by a motor (not illustrated). Then, the photosensitive drum 102y is charged by the charging device 114y. An electrostatic latent image is formed on the charged photosensitive drum 102y by laser light (laser beam) emitted from. the exposure device 103y and is developed with yellow toner by the development device 115y.

Then, the yellow image developed on the photosensitive drum 102y is transferred onto an intermediate transfer belt 104 by a transfer bias applied to a primary transfer roller 105y. The intermediate transfer belt 104 functions as an intermediate transfer member onto which the images are transferred. Further, the intermediate transfer belt 104 functions as an image bearing member which bears and conveys the images.

The images formed by the image forming units Y, M, C, and Bk are transferred and superimposed on the intermediate transfer belt 104. In this way, a full-color image is formed on the intermediate transfer belt 104. The direction of an arrow B indicates the conveyance direction in which the intermediate transfer belt 104 conveys the image. The image borne on the intermediate transfer belt 104 is conveyed to a transfer area for transferring the image borne on the intermediate transfer belt 104 onto a sheet. A sheet stored in a storage portion 110a or 110b is fed by a sheet feeding roller (not illustrated) and conveyed by a sheet conveying roller (not illustrated) to a registration roller 111.

The transfer area is a nip area formed by the intermediate transfer belt 104 and a secondary transfer roller 113. The secondary transfer roller 113 presses the intermediate transfer belt 104 against a roller 106 to form the nip area. The registration roller 111 conveys the sheet to the transfer area in synchronization with the timing at which the image arrives at the transfer area. The transfer bias is applied to the secondary transfer roller 113 when the sheet passes through the transfer area. In this way, the image on the intermediate transfer belt 104 is transferred onto the sheet. Thereafter, the sheet with the transferred image is conveyed to a fixing device 107. The fixing device 107 includes a heater (not illustrated) and two rollers (not illustrated), and the image is fixed to the sheet by heat from the heater and pressure from the rollers. Then, the sheet having passed through the fixing device 107 is discharged to the outside of the image forming apparatus 100 by a sheet discharge roller.

Further, the intermediate transfer belt 104 includes a belt cleaner 108 configured to remove the development agent which is not transferred to the sheet at the transfer area and remains. Further, a pattern detection sensor 109 for detecting pattern images described below is provided near the intermediate transfer belt 104. As illustrated in FIG. 1, the pattern detection sensor 109 is situated between the image forming unit Bk and the roller 106 in the conveyance direction of the intermediate transfer belt 104.

Further, the user can instruct the image forming apparatus 100 to start forming an image or can instruct the image forming apparatus 100 to execute color misregistration correction control described below by operating the operation panel 20.

(Functional Block Diagram)

Figure 2:
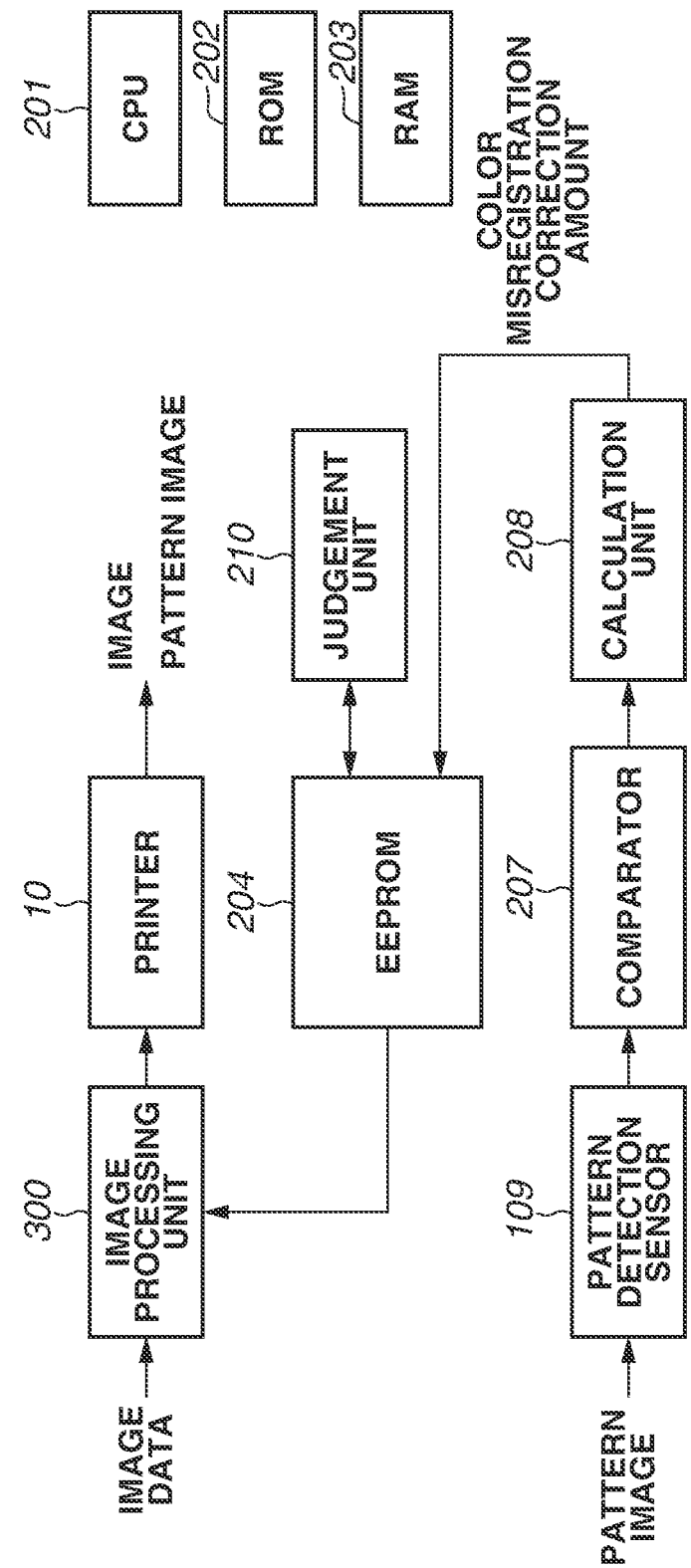
FIG. 2 is a functional block diagram of the image forming apparatus.

Next, a functional block diagram of the image forming apparatus 100 will be described below with reference to FIG. 2. A central processing unit (CPU) 201, which may include one or more processors and one or more memories, is a control circuit (controller) which may control each component of the image forming apparatus 100. A read-only memory (ROM) 202 stores control programs which are to be executed by the CPU 201 for executing various processes illustrated in flow charts described below. A random-access memory (RAM) 203 is a system work memory for the CPU 201 to operate. Description of the printer 10 and the pattern detection sensor 109 is omitted. An electrically erasable programmable ROM (EEPROM) 204 is a non-volatile storage device. The EEPROM 204 performs serial communication with the CPU 201, and therefore, it takes time to write data. The ROM 202 and the RAM 203 are connected to the CPU 201 via a bus.

A comparator 207 converts an analog signal of the pattern detection sensor 109 into a binary digital signal based on a threshold value set by the CPU 201. The converted digital signal is output to a calculation unit 208. The calculation unit 208 determines amounts of color misregistration based on the output signal of the pattern detection sensor 109 which is input via the comparator 207. A method of the determination of the amounts of color misregistration will be described below with reference to FIG. 4. The amounts of color misregistration are written to a main area and to a mirror area of the EEPROM 204.

A judgement unit 210 judges whether the color misregistration correction amount stored in the EEPROM 204 is abnormal. A method of the judgement by the judgement unit 210 will be described below with reference to FIG. 7. If the judgement unit 210 judges that the color misregistration correction amount stored in the EEPROM 204 is abnormal, the judgement unit 210 overwrites the color misregistration correction amount stored in the EEPROM 204 with an initial value. The initial value is set to, for example, zero. An image processing unit 300 corrects image data based on the color misregistration correction amount stored in the EEPROM 204 to correct the writing start positions of the images of the respective colors.

The image processing unit 300, for example, shifts the writing start positions of the images in the direction orthogonal to the conveyance direction of the intermediate transfer belt 104 by a distance of pixels corresponding to the color misregistration correction amount from a reference position in the direction in which scanning is performed with the laser light emitted from the exposure device 103y. The shift amount in the direction in which scanning is performed with the laser light corresponds to an image forming condition. In this way, the writing timings in a main-scan direction in which the laser light of the exposure device 103y scans the photosensitive drum 102y are adjusted. The image processing unit 300, for example, shifts the writing start positions of the images in the conveyance direction of the intermediate transfer belt 104 by a distance corresponding to the color misregistration correction amount from a reference position in the direction in which the surface of the photosensitive drum 102y is moved. In this way, the writing start timings in a sub-scan direction parallel to the conveyance direction of the intermediate transfer belt 104 are adjusted. The shift amount in the direction in which the photosensitive drums are rotated corresponds to the image forming condition.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

(Color Misregistration Correction Control)

In the image forming apparatus 100, the image forming position varies for each color due to a change in a heat source (motor and heater) and an environmental change. This causes deviations of the relative positions of the transferred images on the intermediate transfer belt 104, and the color taste of the image formed on the sheet can be different from a desired color taste. Thus, the image forming apparatus 100 executes color misregistration correction control to correct the relative deviations of the image forming positions. The image forming apparatus 100 executes color misregistration correction control if, for example, the number of sheets on which images are formed (the number of image-formed sheets) reaches a predetermined number. Alternatively, the image forming apparatus 100 executes color misregistration correction control if, for example, the internal temperature changes by a predetermined degree or more.

Figure 3A:
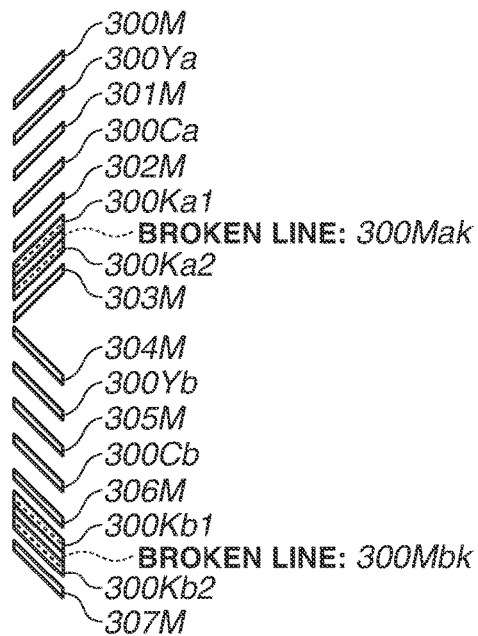
FIGS. 3A and 3B are schematic diagrams illustrating pattern images.
Figure 3B:
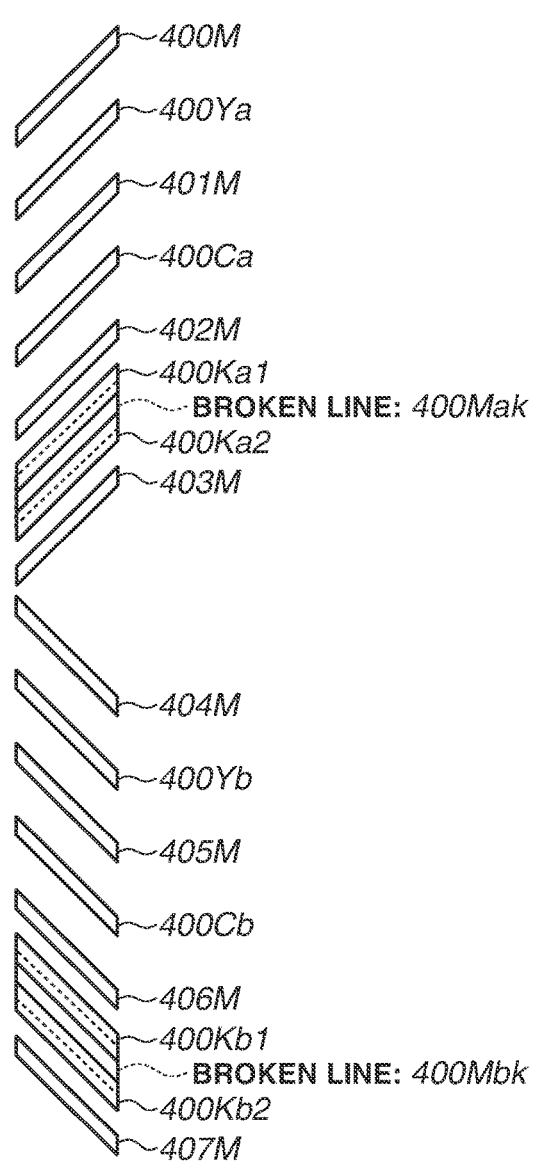

FIGS. 3A and 3B are schematic diagrams illustrating a pattern image formed on the intermediate transfer belt 104. The pattern image includes two types of pattern images. FIG. 3A is a pattern image formed for the correction of fine color misregistrations. Hereinafter, the pattern image illustrated in FIG. 3A will be referred to as "fine adjustment pattern". The fine adjustment pattern is formed to correct, for example, color misregistrations caused by a change in internal temperature by a predetermined degree or more. FIG. 3B is a pattern image formed for the correction of color misregistrations to which the fine adjustment pattern is not applicable. Hereinafter, the pattern image illustrated in FIG. 3B will be referred to as "rough adjustment pattern". The rough adjustment pattern is formed to correct, for example, color misregistrations caused by a replacement of parts of the image forming apparatus 100.

The fine adjustment pattern includes magenta images 300M, 301M, 302M, 303M, 304M, 305M, 306M, and 307M corresponding to reference color images. Further, the fine adjustment pattern includes yellow images 300Ya and 300Yb, cyan images 3000a and 3000b, and black images 300Ka1, 300Ka2, 300Kb1, and 300Kb2. The reflectance of the intermediate transfer belt 104 is substantially equal to the reflectance of the black images 300Ka1, 300Ka2, 300Kb1, and 300Kb2. Thus, for example, the black images 300Ka1, 300Ka2, 300Kb1, and 300Kb2 are superimposed on magenta images 300Mak and 300Mbk.

The rough adjustment pattern includes magenta images 400M, 401M, 402M, 403M, 404M, 405M, 406M, and 407M corresponding to the reference color images. The rough adjustment pattern further includes yellow images 400Ya and 400Yb, cyan images 400Ca and 4000b, and black images 400Ka1, 400Ka2, 400Kb1, and 400Kb2. In the rough adjustment pattern, the black images 400Ka1, 400Ka2, 400Kb1, and 400Kb2 are superimposed on the magenta images 400Mak and 400Mbk, as in the fine adjustment pattern.

The length of the rough adjustment pattern in the conveyance direction of the intermediate transfer belt 104 is longer than the length of the fine adjustment pattern in the conveyance direction. Further, the length of the rough adjustment pattern in the direction which is orthogonal to the conveyance direction is longer than the length of the fine adjustment pattern in the direction which is orthogonal to the conveyance direction. Further, the intervals of the rough adjustment pattern in the conveyance direction are longer than the intervals of the fine adjustment pattern in the conveyance direction.

(Method of Calculation of Color Misregistration Correction Amount)

Figure 4:
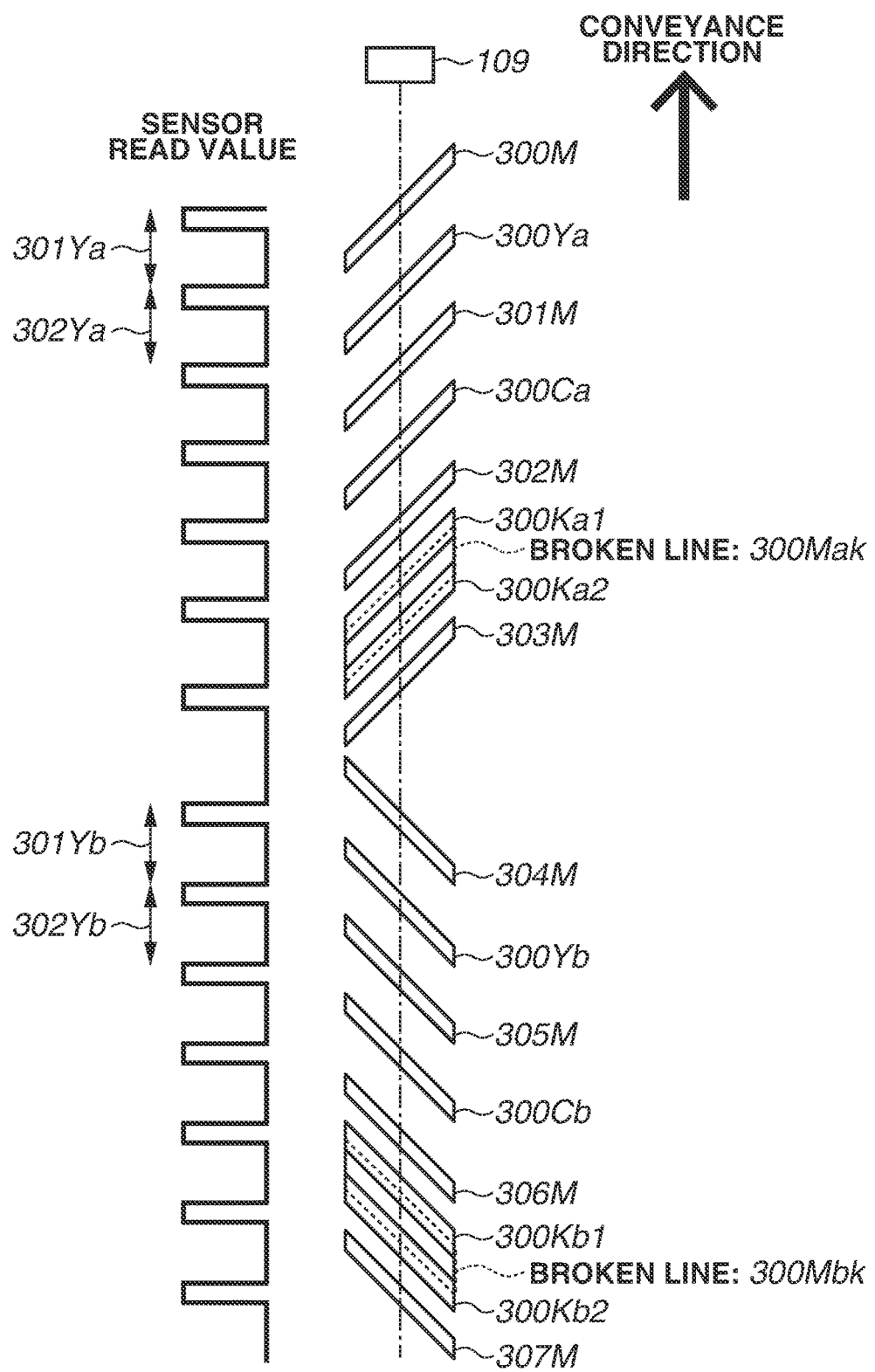
FIG. 4 illustrates a correspondence relationship between the pattern images and sensor output values.

FIG. 4 schematically illustrates a digital signal corresponding to a result of fine adjustment pattern detection by the pattern detection sensor 109. For example, the relative deviation amount of the yellow image forming position with respect to the magenta image forming position is calculated by formulas (1) and (2) below.

$$\text{Main-scan deviation amount} = \{(302Ya - 301Ya)/2 - (302Yb - 301Yb)/2\}/2 \qquad (1).$$

$$\text{Sub-scan deviation amount} = \{(302Ya - 301Ya)/2 + (302Yb - 301Yb)/2\}/2 \qquad (2).$$

In formulas (1) and (2), the distance 301Ya is obtained based on the time from the timing of the detection of the magenta image 300M to the timing of the detection of the yellow image 300Ya in the digital signal output from the comparator 207 and the conveyance speed. Similarly, the distance 302Ya is obtained based on the time from the timing of the detection of the yellow image 300Ya to the timing of the detection of the magenta image 301M in the digital signal output from the comparator 207 and the conveyance speed.

In formulas (1) and (2), the distance 301Yb is obtained based on the time from the timing of the detection of the magenta image 304M to the timing of the detection of the yellow image 300Yb in the digital signal output from the comparator 207 and the conveyance speed. Similarly, the distance 302Yb is obtained based on the time from the timing of the detection of the yellow image 300Yb to the timing of the detection of the magenta image 305M in the digital signal output from the comparator 207 and the conveyance speed.

The amounts of color misregistration of cyan and black are also calculated similarly. Further, FIGS. 3A and 3B are different only in size. The amounts of color misregistration with respect to the rough adjustment pattern are calculated similar to the amounts of color misregistration with respect to the fine adjustment pattern. Description of a method of calculation of the amounts of color misregistration using the rough adjustment pattern is omitted.

In the case where the color misregistration correction control using the fine adjustment pattern is executed, ten fine adjustment, patterns, for example, are formed. Then, the calculation unit 208 (FIG. 2) calculates the mean of the ten amounts of color misregistration calculated for each color. The EEPROM 204 (FIG. 2) stores the mean value of the amounts of color misregistration. Further, in the case where the color misregistration correction. control using the rough adjustment pattern is executed, four rough adjustment patterns, for example, are formed. Then, the calculation unit 208 (FIG. 2) calculates the mean of the four amounts of color misregistration calculated for each color. The EEPROM 204 (FIG. 2) stores the mean value of the amounts of color misregistration.

(Sequence of Control of Image Forming Apparatus)

Figure 5:
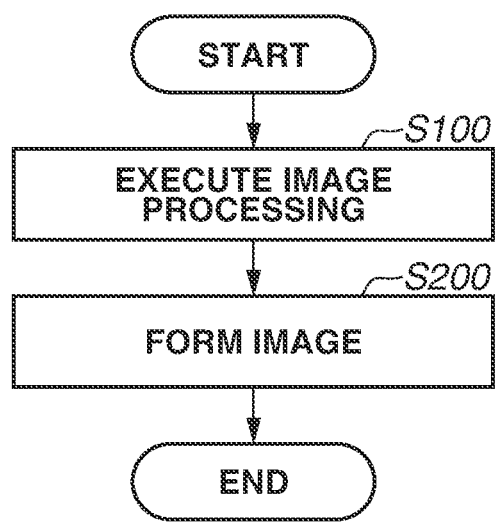
FIG. 5 is a flowchart illustrating an image forming operation.

Next, an image forming operation in which the image forming apparatus 100 forms an image based on image data will be described below with reference to a flowchart illustrated in FIG. 5. If the CPU 201 receives image data, the CPU 201 reads the program stored in the ROM 202 and executes a process illustrated in the flowchart in FIG. 5.

In step S100, if the image data is transferred, the CPU 201 causes the image processing unit 300 to execute image processing on the image data to correct deviations of the relative image forming positions. In step S100, the image processing unit 300 executes image processing on the image data to correct the main-scan deviation amount, and the sub-scan deviation amount based on the color misregistration correction amount stored in the EEPROM 204.

Next, in step S200, the CPU 201 controls the printer 10 to form an image on a sheet based on the image data having undergone the image processing executed by the image processing unit 300, and the image forming of one page is ended. The image forming operation of the printer 10 in step S200 has already been described above, and therefore, description thereof is omitted.

Figure 6A:
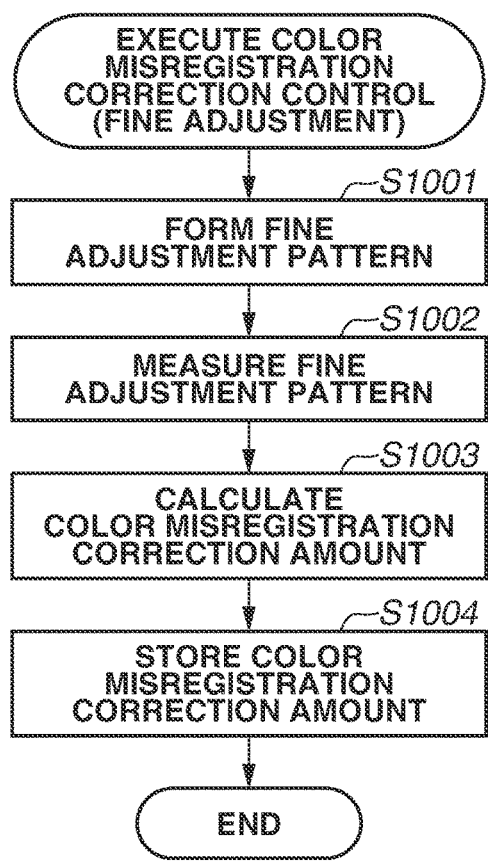
FIGS. 6A and 6B are flowcharts illustrating color misregistration correction control.

FIG. 6A is a flowchart illustrating the color misregistration correction control using the fine adjustment pattern. The color misregistration correction control illustrated in FIG. 6A is executed in the case of correcting fine color misregistrations. Hereinafter, the color misregistration correction control using the fine adjustment pattern will be referred to as "color misregistration correction control (fine adjustment)". In the case of executing the color misregistration correction control (fine adjustment), the CPU 201 reads the program stored in the ROM 202 and executes the process illustrated in the flowchart in FIG. 6A.

First, in step S1001, the CPU 201 controls the printer 10 to form ten fine adjustment patterns on the intermediate transfer belt 104. In step S1001, the CPU 201 controls the image processing unit 300 to execute image processing on fine adjustment pattern image data. At this time, the image processing unit 300 executes image processing on the fine adjustment pattern image data based on the color misregistration correction amount stored in the EEPROM 204. Then, the printer 10 forms the fine adjustment patterns on the intermediate transfer belt 104 based on the fine adjustment pattern image data having undergone the image processing. Accordingly, the fine adjustment patterns are formed with the adjusted shift amount in the scan direction of the laser light and the adjusted shift amount in the rotation direction of the photosensitive drum.

Next, in step S1002, the CPU 201 controls the pattern detection sensor 109 to measure the fine adjustment patterns. The result of the fine adjustment pattern detection by the pattern detection sensor 109 is converted into a digital signal by the comparator 207. Then, in step S1003, the CPU 201 controls the calculation unit 208 to calculate the color misregistration correction amount. The method of calculation of the color misregistration correction amount has already been described above with reference to FIG. 4, and therefore, description thereof is omitted. In step S1004, the CPU 201 stores in the EEPROM 204 the color misregistration correction amount calculated in step S1003. Then, the CPU 201 ends the color misregistration correction control (fine adjustment).

Figure 6B:
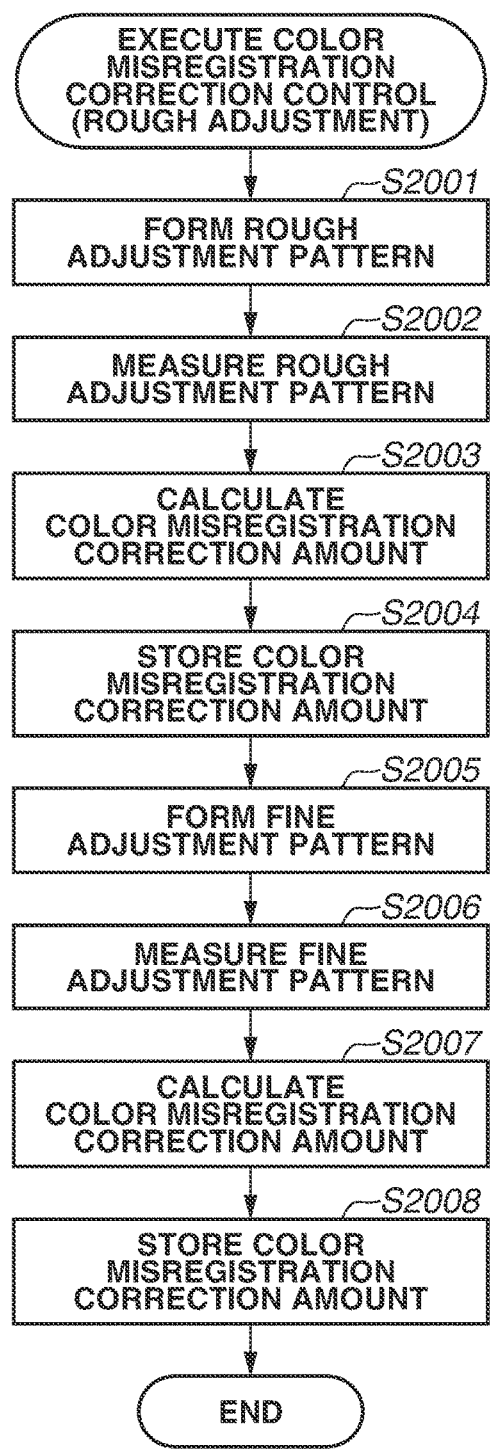

FIG. 6B is a flowchart illustrating the color misregistration correction control using the rough adjustment pattern. The color misregistration correction control illustrated in FIG. 6B is executed in the cases in which the amount of color misregistration is predicted to be greater than a predetermined amount. Hereinafter, the color misregistration correction control using the rough adjustment pattern will be referred to as "color misregistration correction control (rough adjustment)". In the case of executing the color misregistration correction control (rough adjustment), the CPU 201 reads the program stored in the ROM 202 and executes the process illustrated. in the flowchart in FIG. 6B.

First, in step S2001, the CPU 201 controls the printer 10 to form four rough adjustment patterns on the intermediate transfer belt 104. In step S2001, the printer 10 forms the rough adjustment patterns on the intermediate transfer belt 104 based on rough adjustment pattern image data. In step S2001, the rough adjustment pattern image data has undergone no image processing.

Next, in step S2002, the CPU 201 controls the pattern detection sensor 109 to measure the rough adjustment patterns. The result of the rough adjustment pattern by the pattern detection sensor 109 is converted into a digital signal by the comparator 207. Then, in step S2003, the CPU 201 controls the calculation unit 208 to calculate the color misregistration correction amount. In step S2004, the CPU 201 stores in the EEPROM 204 the color misregistration correction amount calculated in step S2003.

Next, in step S2005, the CPU 201 controls the printer 10 to form ten fine adjustment patterns on the intermediate transfer belt 104. In step S2005, the CPU 201 controls the image processing unit 300 to execute image processing on fine adjustment pattern image data. At this time, the image processing unit 300 executes image processing on the fine adjustment pattern image data based on the color misregistration correction amount stored in the EEPROM 204 in step S2004. Then, the printer 10 forms the fine adjustment patterns on the intermediate transfer belt 104 based on the fine adjustment pattern image data having undergone the image processing.

Next, in step S2006, the CPU 201 controls the pattern detection sensor 109 to measure the fine adjustment patterns. The result of the fine adjustment pattern detection by the pattern detection sensor 109 is converted into a digital signal by the comparator 207. Then, in step S2007, the CPU 201 controls the calculation unit 208 to calculate the color misregistration correction amount. In step S2008, the CPU 201 stores in the EEPROM 204 the color misregistration correction amount calculated in step S2007. In step S2008, the color misregistration correction amount stored in step S2004 is erased, and the color misregistration correction amount calculated in step S2007 is stored in the EEPROM 204. Then, the CPU 201 ends the color misregistration correction control (rough adjustment).

(EEPROM Error Judgement)

If the supply of power to a storage device which takes time to write data, such as the EEPROM 204, while data is written to the storage device is stopped, correct data is not stored in the storage device. For example, if the image forming apparatus 100 is turned off and the supply of power to the CPU 201 is stopped, the EEPROM 204 ends up containing a mixture of an area in which the latest data is stored and an area in which old data is stored.

If the color misregistration correction amount is not correctly stored in the EEPROM 204, color misregistrations can occur even if an image is formed based on image data having undergone image processing executed by the image processing unit 300. Thus, the image forming apparatus 100 needs to judge whether data is correctly stored in the EEPROM 204 after the power is turned on. Specifically, the CPU 201 judges whether there is an abnormality in the EEPROM 204. The CPU 201 judges whether data is correctly stored in the EEPROM 204 based on the value of a checksum stored in a predetermined storage area in the EEPROM 204.

Further, the color misregistration correction amount is stored in two areas, a main area and a mirror area, in the EEPROM 204. Specifically, the EEPROM 204 includes another storage area for mirroring data. The CPU 201 executes color misregistration correction control, and when storing the color misregistration correction amount in the EEPROM 204, the CPU 201 stores the color misregistration correction amount in both the main area and the mirroring area.

Further, the CPU 201 calculates the sum of the color misregistration correction amounts of yellow, magenta, cyan, and black to obtain a total value (checksum). The CPU 201 stores the color misregistration correction amounts in the EEPROM 204 and thereafter stores the total value (checksum) in a sub-storage area included in the main area of the EEPROM 204. Specifically, the main area includes a first storage area and a first sub-storage area. The color misregistration correction amounts are stored in the first storage area, and the checksum is stored in the first sub-storage area. Further, after storing the color misregistration correction amounts in the EEPROM 204, the CPU 201 stores the total value (checksum) in the sub-storage area included in the mirror area of the EEPROM 204. Specifically, the mirror area includes a second storage area and a second sub-storage area. The color misregistration correction amounts are stored in the second storage area, and the checksum is stored in the second sub-storage area.

Figure 7:
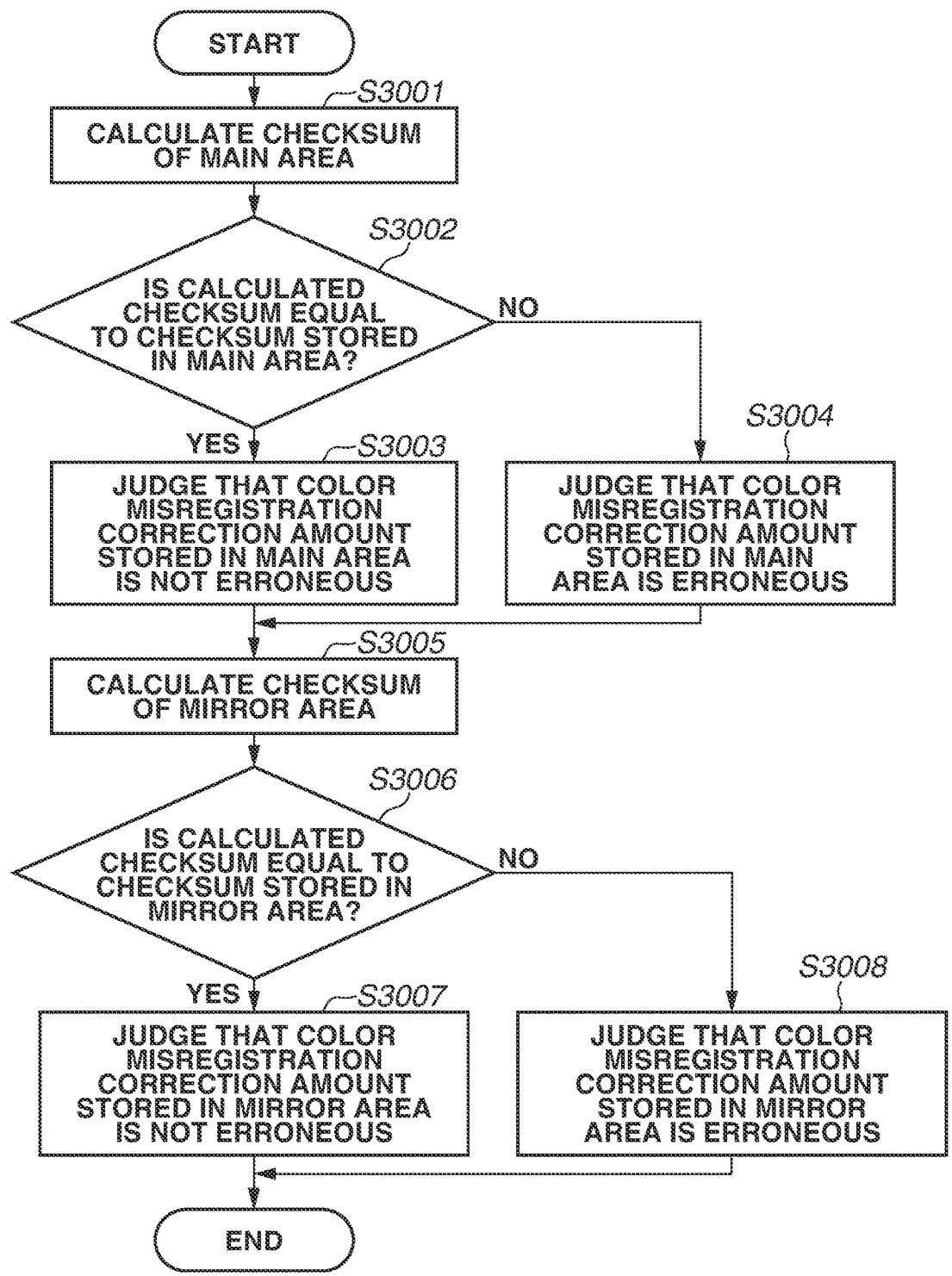
FIG. 7 is a flowchart illustrating an error judgement of an electrically erasable programmable read-only memory (EEPROM).

Next, the judgement of errors in the EEPROM 204 to judge whether data in the EEPROM 204 is correctly stored will be described below with reference to FIG. 7. If the image forming apparatus 100 having been turned off is turned on, the CPU 201 reads the program stored in the ROM 202 and executes the process illustrated in FIG. 7

First, in step S3001, the CPU 201 controls the judgement unit 210 to read the color misregistration correction amounts from the main area of the EEPROM 204 and calculate the total value of the color misregistration correction amounts. Then, in step S3002, the CPU 201 controls the judgement unit 210 to judge whether the total value calculated in step S3001 is equal to the total value stored in the sub-storage area of the main area of the EEPROM 204. In step S3002, if the total value calculated in step S3001 is equal to the total value stored in the sub-storage area of the main area of the EEPROM 204 (YES in step S3002), then in step S3003, the judgement unit 210 judges that the color misregistration correction amounts stored in the main area are not erroneous. Then, the processing proceeds to step S3005.

On the other hand, in step S3002, if the total value calculated in step S3001 is different from the total value stored in the sub-storage area of the main area of the EEPROM 204 (NO in step S3002), then in step S3004, the judgement unit 210 judges that the color misregistration correction amounts stored in the main area are erroneous. Then, the processing proceeds to step S3005.

In step S3005, after the error judgement process with respect to the main area is completed, the CPU 201 controls the judgement unit 210 to read the color misregistration correction amounts from the mirror area of the EEPROM 204 and calculate the total value of the color misregistration correction amounts. Then, in step S3006, the CPU 201 controls the judgement unit 210 to judge whether the total value calculated in step S3005 is equal to the total value stored in the sub-storage area of the mirror area of the EEPROM 204. In step S3006, if the total value calculated in step S3005 is equal to the total value stored in the sub-storage area of the mirror area of the EEPROM 204 (YES in step S3006), then in step S3007, the judgement unit 210 judges that the color misregistration correction amounts stored in the mirror area are not erroneous. Then, the CPU 201 ends the error judgement process.

On the other hand, in step S3006, if the total value calculated in step S3005 is different from the total value stored in the sub-storage area of the mirror area of the EEPROM 204 (NO in step S3006), then in step S3008, the judgement unit 210 judges that the color misregistration correction amounts stored in the mirror area are erroneous. Then, the CPU 201 ends the error judgement process.

Figure 8:
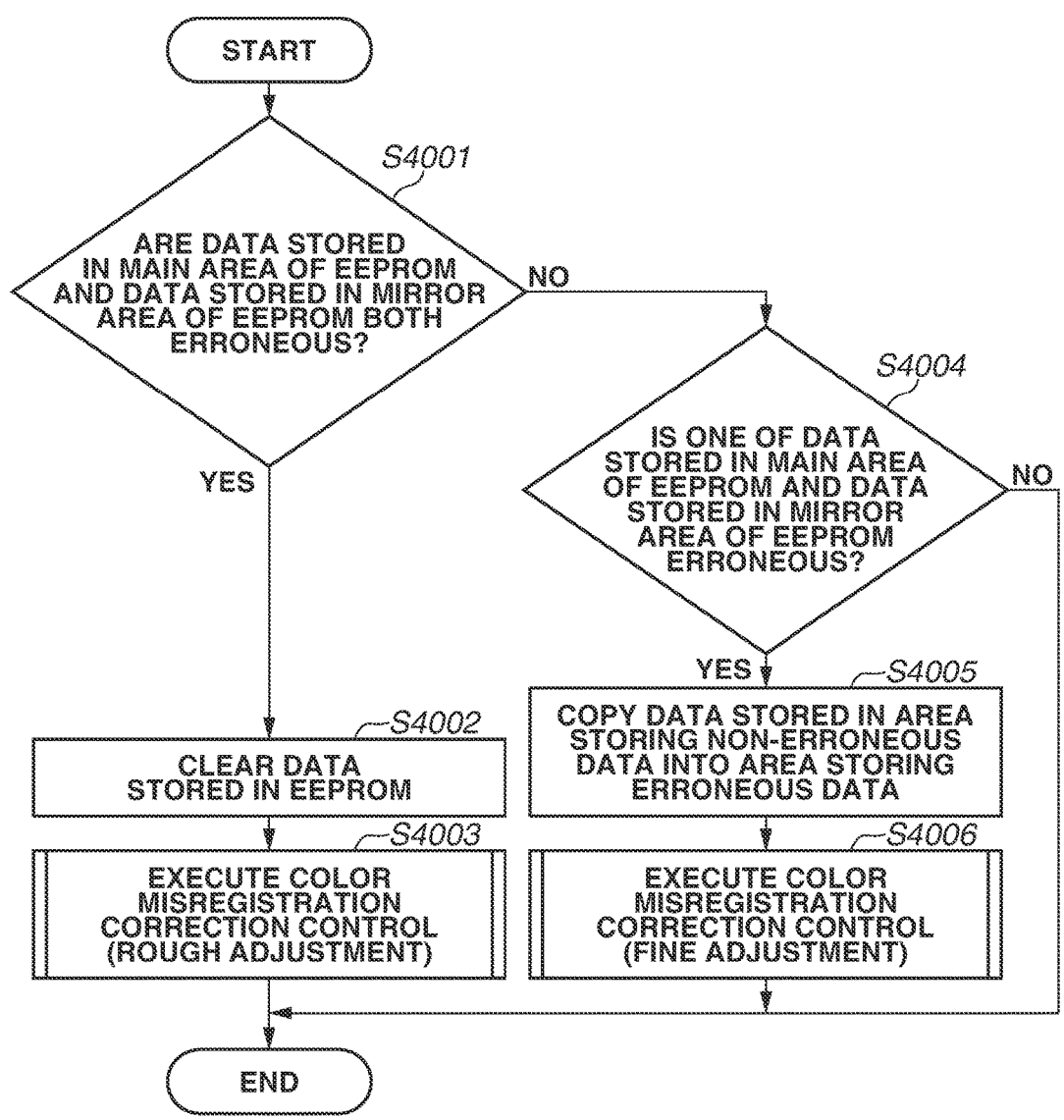
FIG. 8 is a flowchart illustrating an initial operation of the image forming apparatus.

Next, a flowchart of an initial operation for the color misregistration correction control based on the result of the error judgement process will be described below with reference to FIG. 8. After the error judgement process illustrated in FIG. 7 is executed, the CPU 201 reads a control program of the initial operation which is stored in the ROM 202, and executes the process illustrated in the flowchart in FIG. 8.

in step S4001, the CPU 201 judges whether the color misregistration correction amounts stored in the main area and the color misregistration correction amounts stored in the mirror area are both erroneous, based on the result of the error judgement process. In step S4001, if the color misregistration correction amounts stored in the main area and the color misregistration correction amounts stored in the mirror area are both erroneous (YES in step S4001), the CPU 201 judges that, data on the color misregistration correction amounts cannot be recovered. Thus, in step S4002, the CPU 201 erases the values of the color misregistration correction amounts stored in the main area and in the mirror area.

In the case where the values of the color misregistration correction amounts are erased, color misregistrations are highly likely to occur in images formed by the printer 10. Further, in the case where there is no color misregistration correction amount data, color misregistrations can occur which are too significant to detect amounts of color misregistration with the fine adjustment pattern. Thus, in step S4003, the CPU 201 executes color misregistration correction control (rough adjustment) and acquires new color misregistration correction amounts. Then, the CPU 201 ends the initial operation process.

On the other hand, in step S4001, if the color misregistration correction amounts stored in the main area and the color misregistration correction amounts stored in the mirror area are not erroneous (NO in step S4001), then in step S4004, the CPU 201 judges whether the color misregistration correction amounts stored in the main area or the color misregistration correction amounts stored in the mirror area is erroneous. In step S4004, if the color misregistration correction amounts stored in the main area or the color misregistration correction amounts stored in the mirror area is erroneous (YES in step S4004), then in step S4005, the CPU 201 controls the judgement unit 210 to rewrite the erroneous color misregistration correction amounts with correct color misregistration correction amounts. In step S4005, if the color misregistration correction amounts stored in the main area are erroneous, the judgement unit 210 copies the color misregistration correction amounts stored in the mirror area to the main area. On the other hand, in step S4005, if the color misregistration correction amounts stored in the mirror area are erroneous, the judgement unit 210 copies the color misregistration correction amounts stored in the main area to the mirror area.

In this case, the data is recovered, but the color misregistration correction amounts may be old color misregistration correction amounts. However, since the color misregistration correction amount data is not erroneous, the amounts of color misregistration are detectable even with the fine adjustment patterns. Thus, in step S4006, the CPU 201 executes color misregistration correction control (fine adjustment) and updates the color misregistration correction amounts. Then, the CPU 201 ends the initial operation process.

Further, in step S4004, if neither the color misregistration correction amounts stored in the main area nor the color misregistration correction amounts stored in the mirror area are erroneous (NO in step S4004), the CPU 201 ends the initial operation process.

As described above, in the image forming apparatus 100 using the EEPROM 204 which takes time to write data, even if the writing of the color misregistration correction amounts is not completed, the judgement of errors in the amounts of color misregistration is executed to reduce color misregistrations in output images with great accuracy.

Further, while the color misregistration correction amounts are stored in the two areas, the main area and the mirror area, in the image forming apparatus 100, for example, the EEPROM 204 can include two or more mirror areas. In the case of this configuration, the color misregistration correction control (rough adjustment) is executed if the data stored in the main area and the data stored in the mirror area are both erroneous, whereas the color misregistration correction control (fine adjustment) is executed if one of the data stored in the main area and the data stored in the mirror area is erroneous.

Further, while the magenta pattern images are described as the reference color pattern image, the reference color pattern image can be a pattern image of another color other than black.

Further, while the color misregistration correction amounts are stored in the EEPROM 204 in the above description, values (amounts of color misregistration) with respect to the intervals of the pattern images can be stored. In the case of this configuration, the image processing unit 300 reads from the EEPROM 204 the values (amounts of color misregistration) with respect to the intervals of the pattern images, calculates the color misregistration correction amounts, and corrects the image forming positions based on the calculation result.

The image forming apparatus 100 according to the present exemplary embodiment can reduce color misregistrations even if the data acquired by the color misregistration correction control is normally not stored.

The EEPROM 204 according to the above-described exemplary embodiment includes the main area and the mirror area. The image forming apparatus 100 according to the above-described exemplary embodiment executes color misregistration correction control (rough adjustment) if the data stored in the main area and the data stored in the mirror area are both erroneous. Further, the image forming apparatus 100 according to the above-described exemplary embodiment executes color misregistration correction control (fine adjustment) if one of the data stored in the main area and the data stored in the mirror area is erroneous.

Another exemplary embodiment of the present disclosure will be described below. Components similar to those in the above-described exemplary embodiment are given the same reference numerals, and description thereof is omitted.

In the image forming apparatus 100 according to the present exemplary embodiment, the color misregistration correction amounts are stored in the EEPROM 204. Further, the value of the checksum is stored in the sub-storage area in the EEPROM 204.

Figure 9:
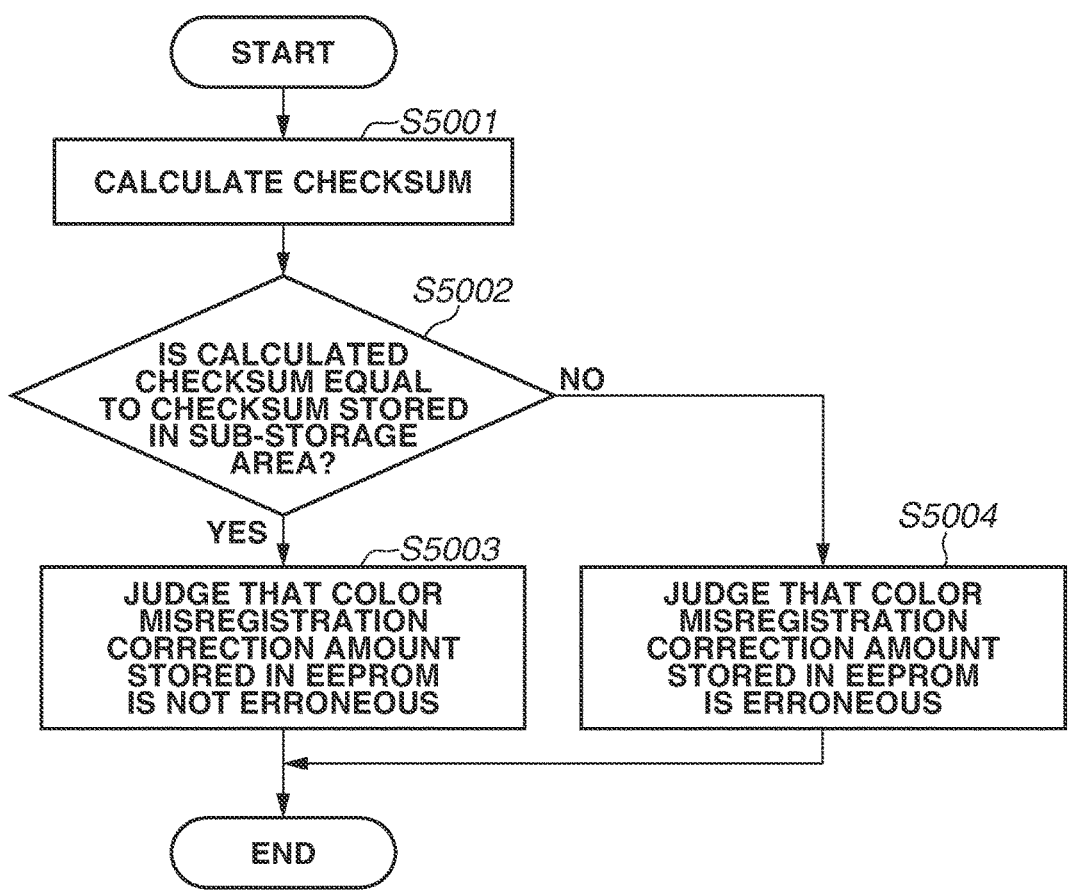
FIG. 9 is a flowchart illustrating an error judgement of an EEPROM according to another exemplary embodiment.

The judgement of errors in the EEPROM 204 to judge whether data in the EEPROM 204 is correctly stored will be described below with reference to FIG. 9. If the image forming apparatus 100 having been turned off is turned on, the CPU 201 reads the program stored in the ROM 202 and executes the process illustrated in FIG. 9.

First, in step S5001, the CPU 201 controls the judgement unit 210 to read the color misregistration correction amounts from the EEPROM 204 and calculate the total value of the color misregistration correction amounts. Then, in step S5002, the CPU 201 controls the judgement unit 210 to judge whether the total value calculated in step S5001 is equal to the total value stored in the sub-storage area of the EEPROM 204. In step S5002, if the total value calculated in step S5001 is equal to the total value stored in the sub-storage area of the EEPROM 204 (YES in step S5002), then in step S5003, the judgement unit 210 judges that the color misregistration correction amounts stored in the EEPROM 204 are not erroneous. Then, the CPU 201 ends the error judgement process.

On the other hand, in step S5002, if the total value calculated in step S5001 is different from the total value stored in the sub-storage area of the EEPROM 204 (NO in step S5002), then in step S5004, the judgement unit 210 judges that the color misregistration correction amounts stored in the EEPROM 204 are erroneous. Then, the CPU 201 ends the error judgement process.

Figure 10:
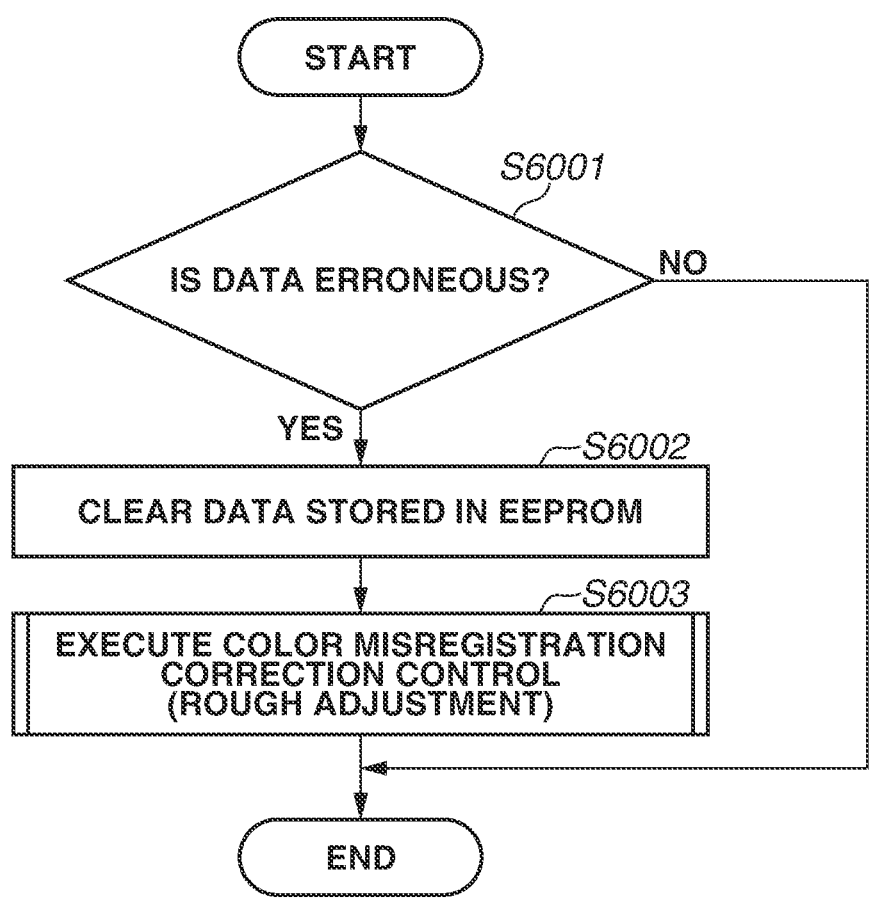
FIG. 10 is a flowchart illustrating an initial operation of an image forming apparatus according to another exemplary embodiment.

Next, a flowchart of an initial operation for the color misregistration correction control based on the result of the error judgement process will be described below with reference to FIG. 10. After the error judgement process illustrated in FIG. 9 is executed, the CPU 201 reads a control program of the initial operation which is stored in the ROM 202, and executes the process illustrated in the flowchart in FIG. 10.

In step S6001, the CPU 201 judges whether the color misregistration correction amounts stored in the EEPROM 204 are erroneous based on the result of the error judgement process. In step S6001, if the color misregistration correction amounts stored in the EEPROM 204 are erroneous (YES in step S6001), the CPU 201 judges that the color misregistration correction amount data cannot be recovered. Thus, in step S6002, the CPU 201 erases the values of the color misregistration correction amounts stored in the EEPROM 204.

In the case where the values of the color misregistration correction amounts are erased, color misregistrations are highly likely to occur in images formed by the printer 10. Further, in the case where there is no color misregistration correction amount data, color misregistrations can occur which are too significant to detect amounts of color misregistration with the fine adjustment pattern. Thus, in step S6003, the CPU 201 executes color misregistration correction control (rough adjustment) and acquires new color misregistration correction amounts. Then, the CPU 201 ends the initial operation process.

On the other hand, in step S6001, if the color misregistration correction amounts stored in the EEPROM 204 are not erroneous (NO in step S6001), the CPU 201 ends the initial operation process.

As described above, in the image forming apparatus 100 using the EEPROM 204 which takes time to write data, even if the writing of the color misregistration correction amounts is not completed, the judgement of errors in the amounts of color misregistration is executed to reduce color misregistrations in output images with great accuracy.

Further, while the color misregistration correction amounts are stored in the EEPROM 204 in the above description, values (amounts of color misregistration) with respect to the intervals of the pattern images may be stored. In the case of this configuration, the image processing unit 300 reads from the EEPROM 204 the values (amounts of color misregistration) with respect to the intervals of the pattern images, calculates the color misregistration correction amounts, and corrects the image forming positions based on the calculation result.

The image forming apparatus 100 according to the present exemplary embodiment can reduce color misregistrations even if the data acquired by the color misregistration correction control is normally not stored.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-037736, filed Feb. 28, 2017, which is hereby incorporated by reference herein in its entirety.

What is claimed is:

1. An image forming apparatus comprising:
   a plurality of image forming units configured to form images, each having a different color;
   an image bearing member;
   a detection unit configured to detect a pattern image formed on the image bearing member, the pattern image being used for detecting a color misregistration;
   a controller configured to control the plurality of image forming units to form on the image bearing member a plurality of first pattern images, each having a different color, and control the detection unit to detect a color misregistration amount related to relative positions between a pattern image having a reference color among the plurality of first pattern images and a pattern image having another color among the plurality of first pattern images; and
   a storage unit configured to store data on the color misregistration amount,
   wherein the controller corrects an image forming position of an image of the other color which is to be formed by the plurality of image forming units, based on the data stored in the storage unit,
   wherein in a case where an error is detected in the data stored in the storage unit, the controller controls the plurality of image forming units to form on the image bearing member a plurality of second pattern images each having a different color before the plurality of first pattern images is formed, and
   wherein the plurality of second pattern images is different from the plurality of first pattern images.

2. The image forming apparatus according to claim 1, wherein the image bearing member conveys the image of the different color, and
   wherein a length of the plurality of second pattern images in a conveyance direction of the image bearing member is longer than a length of the plurality of first pattern images in the conveyance direction.

3. The image forming apparatus according to claim 1, wherein the image bearing member conveys the image of the different color, and
   wherein an interval between a pattern image having the reference color and a pattern image having a predetermined color among the plurality of second pattern images in a conveyance direction of the image bearing member is longer than an interval between a pattern image having the reference color and a pattern image having the predetermined color among the plurality of first pattern images in the conveyance direction of the image bearing member.

4. The image forming apparatus according to claim 1, wherein in a case where no error is detected in the data stored in the storage unit, the controller controls the plurality of image forming units to form the plurality of first pattern images based on the data stored in the storage unit.

5. The image forming apparatus according to claim 1, wherein the controller controls the detection unit to detect a provisional color misregistration amount with respect to relative positions between a pattern image having the reference color among the plurality of second pattern images and a pattern image having the other color among the plurality of first pattern images,
   wherein provisional data on the provisional color misregistration amount is stored in the storage unit, and
   wherein the controller controls the plurality of image forming units based on the provisional data to form the plurality of first pattern images.

6. The image forming apparatus according to claim 1, wherein the storage unit includes a first storage area and a second storage area,
   wherein the data generated by the controller is stored in the first storage area, and
   wherein the data generated by the controller is stored in the second storage area.

7. The image forming apparatus according to claim 6, wherein in a case where an error is detected in both the data stored in the first storage area and the data stored in the second storage area, the controller controls the plurality of image forming units to form the plurality of second pattern images before the plurality of first pattern images is formed.

8. The image forming apparatus according to claim 7, wherein in a case where an error is detected in one of the data stored in the first storage area and the data stored in the second storage area, the controller controls the plurality of image forming units to form the plurality of first pattern images without forming the plurality of second pattern images.

9. The image forming apparatus according to claim 8, wherein in a case where an error is detected in the data stored in the first storage area, the controller controls the plurality of image forming units based on the data stored in the second storage area to form the plurality of first pattern images, and
   wherein in a case where an error is detected in the data stored in the second storage area, the controller controls the plurality of image forming units based on the data stored in the first storage area to form the plurality of first pattern images.

10. The image forming apparatus according to claim 6, wherein the storage unit further includes a first sub-storage area configured to store first sub-data which is used to detect an error in the data stored in the first storage area, and a second sub-storage area configured to store second sub-data which is used to detect an error in the data stored in the second storage area.

11. The image forming apparatus according to claim 10, wherein the controller detects an error in the data stored in the first storage area based on the data stored in the first storage area and the first sub-data stored in the first sub-storage area, and wherein the controller detects an error in the data stored in the second storage area based on the data written to the second storage area and the second sub-data stored in the second sub-storage area.

12. A method of controlling an image forming apparatus including a plurality of image forming units configured to form an image of a different color, an image bearing member, a detection unit configured to detect a pattern image formed on the image bearing member, the pattern image being used to detect a color misregistration, and a storage unit configured to store data on the color misregistration, the method comprising:

forming on the image bearing member a plurality of first pattern images each having a different color;

detecting using the detection unit a color misregistration amount with respect to relative positions between a pattern image having a reference color among the plurality of first pattern images and a pattern image having another color among the plurality of first pattern images; and correcting based on the data stored in the storage unit an image forming position of an image of the other color which is to be formed by the plurality of image forming units, wherein in a case where an error is detected in the data stored in the storage unit, a plurality of second pattern images each having a different color is formed on the image bearing member before the plurality of first pattern images is formed, and wherein the plurality of second pattern images is different from the plurality of first pattern images.

13. The method according to claim 12,
wherein the image bearing member conveys the image of the different color, and wherein a length of the plurality of second pattern images in a conveyance direction of the image bearing member is longer than a length of the plurality of first pattern images in the conveyance direction.

14. The method according to claim 12,
wherein the image bearing member conveys the image of the different color, and wherein an interval between a pattern image having the reference color and a pattern image having a predetermined color among the plurality of second pattern images in a conveyance direction of the image bearing member is longer than an interval between a pattern image having the reference color and a pattern image having the predetermined color among the plurality of first pattern images in the conveyance direction of the image bearing member.

15. The method according to claim 12, wherein in a case where no error is detected in the data stored in the storage unit, the plurality of first pattern images is formed based on the data stored in the storage unit.

16. The method according to claim 12,
wherein in a case where an error is detected in the data stored in the storage unit, a provisional color misregistration amount with respect to relative positions between a pattern image having the reference color among the plurality of second pattern images and a pattern image having the other color among the plurality of first pattern images is detected using the detection unit, and wherein control is performed based on provisional data to form the plurality of first pattern images in order to detect the color misregistration amount.

17. The method according to claim 12,
wherein the storage unit includes a first storage area and a second storage area, wherein the data generated by a controller is stored in the first storage area, and wherein the data generated by the controller is stored in the second storage area.

18. The method according to claim 17, wherein in a case where an error is detected in both the data stored in the first storage area and the data stored in the second storage area, the plurality of second pattern images is formed before the plurality of first pattern images is formed.

19. The method according to claim 18, wherein in a case where an error is detected in one of the data stored in the first storage area and the data stored in the second storage area, the plurality of first pattern images is formed without forming the plurality of second pattern images.

20. The method according to claim 19,
wherein in a case where an error is detected in the data stored in the first storage area, the plurality of first pattern images is formed based on the data stored in the second storage area, and wherein in a case where an error is detected in the data stored in the second storage area, the plurality of first pattern images is formed based on the data stored in the first storage area.

* * * * *